United States Patent
Ji et al.

(10) Patent No.: US 11,134,500 B2
(45) Date of Patent: Sep. 28, 2021

(54) PDCCH RESOURCE CONFIGURATION METHOD, PDCCH RESOURCE DETERMINING METHOD, NETWORK DEVICE AND USER EQUIPMENT

(71) Applicant: VIVO MOBILE COMMUNICATION CO., LTD., Guangdong (CN)

(72) Inventors: Zichao Ji, Chang'an Dongguan (CN); Xiaodong Shen, Chang'an Dongguan (CN); Xueming Pan, Chang'an Dongguan (CN)

(73) Assignee: VIVO MOBILE COMMUNICATION CO., LTD., Chang'an Dongguan (CN)

(*) Notice: Subject to any disclaimer, the term of this patent is extended or adjusted under 35 U.S.C. 154(b) by 0 days.

(21) Appl. No.: 16/638,117

(22) PCT Filed: Aug. 7, 2018

(86) PCT No.: PCT/CN2018/099192
§ 371 (c)(1),
(2) Date: Feb. 10, 2020

(87) PCT Pub. No.: WO2019/029528
PCT Pub. Date: Feb. 14, 2019

(65) Prior Publication Data
US 2020/0245332 A1     Jul. 30, 2020

(30) Foreign Application Priority Data
Aug. 11, 2017   (CN) .......................... 201710687302.4

(51) Int. Cl.
*H04W 72/04*     (2009.01)
*H04W 76/27*     (2018.01)
(Continued)

(52) U.S. Cl.
CPC ....... *H04W 72/0493* (2013.01); *H04L 1/0038* (2013.01); *H04L 1/0071* (2013.01);
(Continued)

(58) Field of Classification Search
CPC ......... H04W 72/1231; H04W 72/1252; H04W 72/0493; H04W 76/27; H04W 72/1273;
(Continued)

(56) References Cited

U.S. PATENT DOCUMENTS

2013/0003604 A1   1/2013  Blankenship et al.
2019/0053318 A1*  2/2019  Nogami .............. H04W 72/042
(Continued)

FOREIGN PATENT DOCUMENTS

CN       102036405 A     4/2011
CN       102469048 A     5/2012
(Continued)

OTHER PUBLICATIONS

European Search Report in Search Report in Application No. 18843573.9 dated Nov. 24, 2020.
(Continued)

*Primary Examiner* — Afshawn M Towfighi
(74) *Attorney, Agent, or Firm* — Maschoff Brennan

(57) ABSTRACT

The present disclosure provides a PDCCH resource configuration method, a PDCCH resource determining method, a network device and a user equipment. The PDCCH resource configuration method is applied to a network device and includes: determining resource configuration information of PDCCH, where the resource configuration information at least includes: REG bundle size, CCE-REG mapping manner, and REG mapping manner; and configuring PDCCH resources according to the resource configuration information, and transmitting the resource configuration information to a user equipment.

17 Claims, 9 Drawing Sheets

(51) Int. Cl.
  *H04L 1/00*  (2006.01)
  *H04W 72/12*  (2009.01)
  *H04W 80/02*  (2009.01)

(52) U.S. Cl.
  CPC ....... *H04W 72/1273* (2013.01); *H04W 76/27* (2018.02); *H04W 80/02* (2013.01)

(58) Field of Classification Search
  CPC ... H04W 80/02; H04W 72/04; H04W 72/042; H04W 72/0453; H04W 76/20; H04L 1/0038; H04L 1/0071; H04L 5/001; H04L 5/0078; H04L 5/0053; H04L 1/00
  See application file for complete search history.

(56) References Cited

U.S. PATENT DOCUMENTS

| | | | |
|---|---|---|---|
| 2019/0103941 A1* | 4/2019 | Seo | ............................ H04L 5/00 |
| 2019/0140776 A1* | 5/2019 | Seo | ....................... H04B 7/0695 |
| 2020/0119869 A1* | 4/2020 | Taherzadeh Boroujeni | ................ H04L 5/0094 |

FOREIGN PATENT DOCUMENTS

| | | |
|---|---|---|
| EP | 2 583 396 | 4/2013 |
| WO | 2011159132 A2 | 12/2011 |

OTHER PUBLICATIONS

"Details of NR-PDCCH structure" 3GPP TSG RAN WG1 Meeting #89, May 15, 2017.
"UE behaviour related to CORESET(s) configured by PBCH" 3GPP TSG RAN WG1 NR Ad-Hoc#2, Jun. 27, 2017.
Mediatek Inc. "Discussion on PDCCH Structure Transmission Scheme" 3GPP TSG RAN WGI Meeting #89 R1-1707821, May 19, 2017.
Qualcom Incorporaated "PDCCH Structure" 3GPP TSG RAN WGI NR Ad-Hoc#2 R1-1711177, Jun. 30, 2017.
Motorola Mobility et al. "On CCE and PDCCH Mapping" 3GPP TSG RAN WGI NR Ad-Hoc#2 R1-1711280, Jun. 30, 2017.
CN Office Action in Application No. 201710687302.4 dated Mar. 10, 2020.
"Disussion on NR-PDCCH Structure" 3GPP TSG RAN WG1 Meeting #88bis, Apr. 3, 2017.
"Discussion on PDCCH Structure and Transmission Scheme" 3GPP TSG RAN WG1 Meeting #89, May 15, 2017.
"PDCCH structure" 3GPP TSG RAN WG1 NR Ad-Hoc#2, Jun. 27, 2017.
"On CCE and PDCCH mapping" 3GPP TSG AN WG1 NR Ad-Hoc #2, Jun. 27, 2017.
Written Opinion and International Search Report in Application No. PCT/CN2018/099192 dated Feb. 27, 2020.

* cited by examiner

PDCCH RESOURCE CONFIGURATION METHOD, PDCCH RESOURCE DETERMINING METHOD, NETWORK DEVICE AND USER EQUIPMENT

CROSS-REFERENCE TO RELATED APPLICATION

This application is the U.S. national phase of PCT Application PCT/CN2018/099192 filed on Aug. 7, 2018, which claims the benefit and priority of Chinese Application No. 201710687302.4, filed on Aug. 11, 2017, which is incorporated herein by reference in its entirety.

TECHNICAL FIELD

The present disclosure relates to the field of communication technologies, and in particular, to a PDCCH resource configuration method, a PDCCH resource determining method, a network device and a user equipment.

BACKGROUND

In wireless access technology standards such as the Long Term Evolution (LTE), a network device (such as a wireless base station) needs to allocate 1 to 4 orthogonal frequency division multiplexing (OFDM) symbols in the downlink frequency band as a physical downlink control channel (PDCCH) for a cell, and all user equipments (UEs) in the cell share the PDCCH. The minimum allocation unit of PDCCH resources is a control channel element (CCE), and a PDCCH candidate set is formed by aggregating one or more CCEs with possible aggregation level (AL) including 1, 2, 4 and 8.

The New Radio (5G NR) system supports flexible PDCCH resource allocation. Instead of multiplexing the same PDCCH for the whole cell, CORESET may be independently configured for each UE as PDCCH for monitoring. Of course, in order to improve resource multiplexing rate, the same PDCCH may be simultaneously configured for several UEs for monitoring. Thus, there may be multiple PDCCH/CORESET of different sizes in the system, and time-frequency resources of the PDCCH/CORESET allocated for multiple UEs may overlap each other; even time-frequency resources of multiple PDCCH/CORESET allocated for the same UE may overlap each other.

The 5G NR system supports dynamic and flexible bandwidth allocation, which divides the system bandwidth into multiple bandwidth parts (BWPs) to support narrowband UEs, or to support the UE to reduce energy consumption by dynamically switching large bandwidth BWP and small bandwidth BWP. Resources of BWPs of different bandwidths may be overlapped, that is, the large BWP includes the small BWP. At this point, time-frequency resources of PDCCH/CORESET of the large BWP also often include time-frequency resources of PDCCH/CORESET of the small BWP. Thus, it is necessary to support overlapping of time-frequency resources of PDCCH/CORESET of different sizes.

The minimum resource allocation unit of PDCCH/CORESET in the 5G NR is a resource element group (REG). A time-domain length of one REG is one OFDM symbol, and a frequency-domain length of one REG is one physical resource block (PRB). When time-domain resources allocated for PDCCH/CORESET exceeds one OFDM symbol, the REG may be mapped to physical resources in a manner of frequency-domain first or time-domain first. Two, three or six REGs define a REG bundle. One CCE is composed of six REGs, and may be divided into one, two or three REG bundles according to mapping manners. That is, one CCE may include one, two or three REG bundles.

Currently, the specific mapping manner for CCE-REG is not determined. Further, resources of multiple different PDCCH/CORESET may overlap each other, and CCE-REG mapping manners of these overlapping PDCCH/CORESET may also be different from each other. Without a good mapping manner, serious resource blocking may be caused. That is, resources allocated for one of PDCCHs may block allocation of multiple or even all resources in another PDCCH.

SUMMARY

In a first aspect, an embodiment of the present disclosure provides a PDCCH resource configuration method, which is applied to a network device and includes:

determining resource configuration information of PDCCH; wherein the resource configuration information at least includes: REG bundle size, CCE-REG mapping manner, and REG mapping manner; and configuring PDCCH resources according to the resource configuration information, and transmitting the resource configuration information to a user equipment.

In a second aspect, an embodiment of the present disclosure provides a PDCCH resource determining method, which is applied to a user equipment and includes:

obtaining resource configuration information of PDCCH from a network device; wherein the resource configuration information at least includes: REG bundle size, CCE-REG mapping manner, and REG mapping manner; and determining a mapping relationship between CCEs and REGs in the PDCCH according to the resource configuration information, and constructing CCEs and corresponding search space according to the mapping relationship between the CCEs and the REGs.

In a third aspect, an embodiment of the present disclosure provides a network device including:

a processing module configured to determine resource configuration information of PDCCH, wherein the resource configuration information at least includes: REG bundle size, CCE-REG mapping manner, and REG mapping manner;

a configuration module configured to configure PDCCH resources according to the resource configuration information;

a transmission module configured to transmit the resource configuration information to a user equipment.

In a fourth aspect, an embodiment of the present disclosure provides a user equipment including:

an obtaining module configured to obtain resource configuration information of PDCCH from a network device; wherein the resource configuration information at least includes a mapping relationship between CCEs and REGs;

a processing module configured to determine the mapping relationship between CCEs and REGs in the PDCCH according to the resource configuration information, and construct CCEs and corresponding search space according to the mapping relationship between the CCEs and the REGs.

In a fifth aspect, an embodiment of the present disclosure provides a network device including: a memory, a processor, and a computer program stored on the memory and executable on the processor; wherein the computer program is executed by the processor to implement steps of the above PDCCH resource configuration method.

In a sixth aspect, an embodiment of the present disclosure provides a user equipment including: a memory, a processor, and a computer program stored on the memory and executable on the processor; wherein the computer program is executed by the processor to implement steps of the above PDCCH resource determining method.

In a seventh aspect, an embodiment of the present disclosure provides a computer readable storage medium including a computer program stored thereon; wherein the computer program is executed by a processor to implement steps of the above PDCCH resource configuration method or implement steps of the above PDCCH resource determining method.

DETAILED DESCRIPTION

The technical solutions of the present disclosure will be described hereinafter in a clear and complete manner in conjunction with the drawings and embodiments. Apparently, the following embodiments are merely a part of, rather than all of, the embodiments of the present disclosure, and based on these embodiments, a person skilled in the art may obtain the other embodiments, which also fall within the scope of the present disclosure.

Embodiments of the present disclosure provide a PDCCH resource configuration method, a PDCCH resource determining method, a network device and a user equipment, which can support multiple PDCCH resource configuration modes, reduce blocking probability of PDCCH resource allocation, and improve system flexibility and resource utilization.

Figure 1:
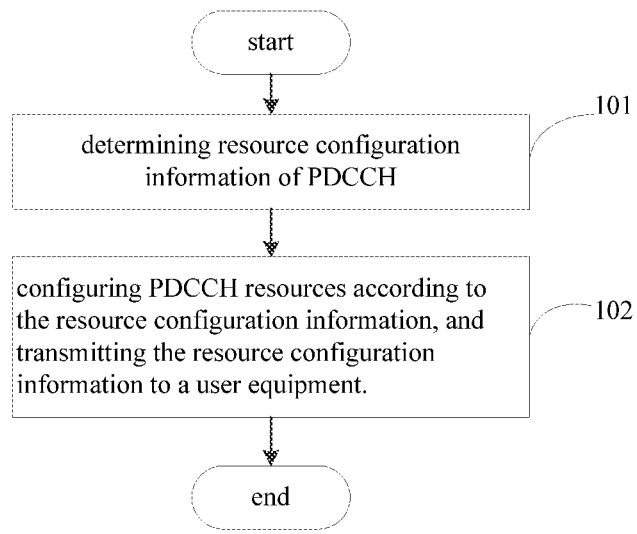
FIG. 1 is a schematic flowchart of a PDCCH resource configuration method according to an embodiment of the present disclosure.

As shown in FIG. 1, an embodiment of the present disclosure provides a PDCCH resource configuration method, which is applied to a network device and includes the following steps.

At Step 101, determining resource configuration information of PDCCH. The resource configuration information at least includes: REG bundle size, CCE-REG mapping manner, and REG mapping manner.

The resource configuration of PDCCH determined by a network device (such as a base station) includes frequency-domain resource (position and number of PRBs) and time-domain resource (number of OFDM symbols), and REG bundle size (including 2, 3, or 6 REGs). REG mapping manner (frequency-domain first or time-domain priority), CCE-REG mapping manner (interleaved mapping or non-interleaved mapping), configuration parameters of interleaver, and the like. In one embodiment, the resource configuration of PDCCH determined by the network device (such as a base station) includes REG bundle size (including 2, 3, or 6 REGs), REG mapping manner, and CCE-REG mapping manner (interleaved mapping or non-interleaved mapping), and configuration parameters of interleaver, and the like. The REG mapping manner includes at least one of frequency-domain resource (position and number of PRBs), time-domain resource (number of OFDM symbols), and mapping order (frequency-domain first or time-domain first).

At Step 102, configuring PDCCH resources according to the resource configuration information, and transmitting the resource configuration information to a user equipment.

The network device may map CCE to one or more REG bundles according to the REG bundle size. When the CCE-REG mapping manner is non-interleaved mapping, the REG bundle is mapped to multiple REGs according to the REG bundle size and the REG mapping manner. When the CCE-REG mapping manner is interleaved mapping, the REG bundle is first interleaved. An interleaver may include a simple row-column interleaver and a complex multiple-stage interleaver, and parameters (such as interleaving interval) of the interleaver can be configured. Then, according to the REG bundle size and the REG mapping manner, the interleaved REG bundle is mapped to multiple REGs.

This embodiment provides a CCE-REG mapping method applicable to PDCCH/CORESET in the 5G NR system, in which the network device sets the resource configuration information of PDCCH and notifies the user equipment of the resource configuration information, where the resource configuration information at least includes: REG bundle size, CCE-REG mapping manner and REG mapping manner. This can effectively support application of multiple different CCE-REG mapping manners to the same PDCCH/CORESET, or configuration that resources of multiple PDCCH/CORESET with different sizes overlap each other. Meanwhile, this can reduce blocking probability of PDCCH resource allocation, and improve system flexibility and resource utilization.

Further, after the step of configuring PDCCH resources according to the resource configuration information, the method further includes:

mapping the PDCCH to a physical resource. The network device maps REG to PRB according to the allocated time-frequency resources of the PDCCH.

The mapping manner described in this embodiment is a mapping from CCE to REG, but the manner of performing mapping may be from REG to CCE, or vice versa from CCE to REG, which are equivalent.

Further, transmitting the resource configuration information to the user equipment includes:

transmitting, by the network device, the resource configuration information to the user equipment, by minimum system information, system information block, radio resource control (RRC), medium access control control element (MAC CE) or group-common PDCCH message.

Further, after the step of transmitting the resource configuration information to the user equipment, the method further includes:

transmitting physical layer control signaling in the PDCCH.

In a specific embodiment, when the CCE-REG mapping manner is non-interleaved mapping, configuring PDCCH resources according to the resource configuration information includes:

mapping each CCE to one or more consecutive REG bundles according to the REG bundle size;

mapping each REG bundle to multiple REGs according to the REG bundle size and the REG mapping manner.

In a specific implementation, the REG bundle size is M REGs, each CCE corresponds to N REG bundles, M is an integer greater than 1, and N is a positive integer. The configuring PDCCH resources according to the resource configuration information specifically includes:

mapping each CCE to N consecutive REG bundles; and
mapping each REG bundle to M consecutive REGs.

Figure 2:
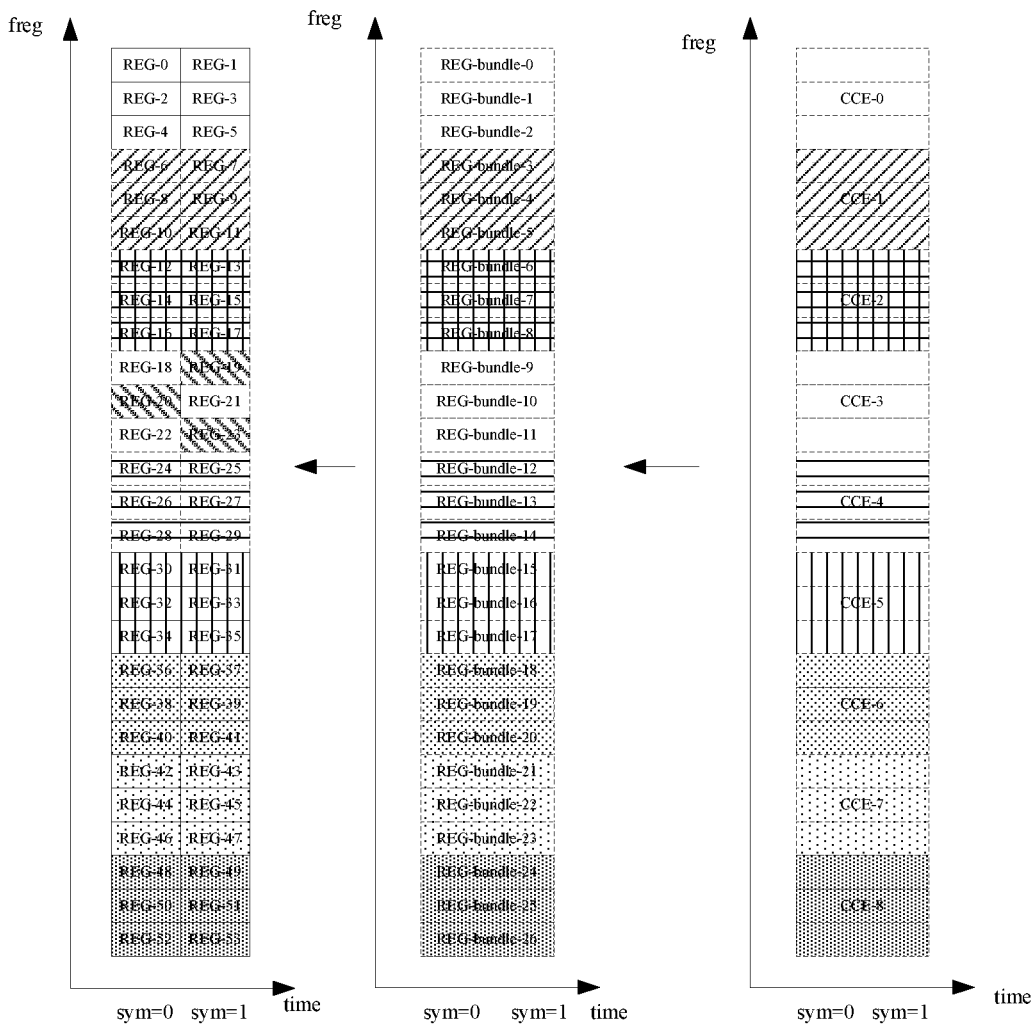
FIG. 2 is a schematic diagram of a CCE-REG mapping manner when the CCE-REG mapping manner is non-interleaved mapping according to a specific embodiment of the present disclosure.

As shown in FIG. 2, the network device allocates 2 OFDM symbols, 27 PRBs, a total of 54 REGs as one PDCCH, the REG bundle size is 2 REGs, the REG bundle is mapped to the REG according to the time-domain first mode, where time represents the time domain and freq represents the frequency domain. The network device configures non-interleaved mapping manner for CCE-REG. Therefore, each CCE (6 REGs) is divided into three consecutive REG bundles. The network device configures mapping the REG bundle to the REG according to the time-domain first mode, thus, each REG bundle is mapped to two consecutive REGs in the time domain For example, CCE-0 is divided into REG-bundle-0, REG-bundle-1, and REG-bundle-2; REG-bundle-0 is mapped to REG-0 and REG-1; REG-bundle-1 is mapped to REG-2 and REG-3; REG-bundle-2 is mapped to REG-4 and REG-5.

In another embodiment, when the CCE-REG mapping manner is interleaved mapping, the resource configuration information further includes a configuration parameter of the interleaver. The configuring PDCCH resources according to the resource configuration information includes:

mapping each CCE to multiple REG bundles according to the REG bundle size;

interleaving the multiple REG bundles according to the configuration parameter of the interleaver;

mapping each interlaced REG bundle to multiple REGs according to the REG bundle size and the REG mapping manner.

The configuration parameter of the interleaver includes at least one of a number of stages of interleaver, the number of interleavers, and an interleaving interval of each interleaver.

The configuration parameter of the interleaver may be configured by the network device. In addition, when there is no network configuration during the initial access, the configuration parameter of the interleaver may be predefined, and then the UE may use the predefined configuration parameter of the interleaver to perform mapping.

In a specific implementation, the REG bundle size is M REGs, each CCE corresponds to N REG bundles, M is an integer greater than 1, and N is a positive integer. The configuring PDCCH resources according to the resource configuration information specifically includes:

mapping each CCE to N consecutive REG bundles;

interleaving the N REG bundles according to the configuration parameter of the interleaver;

mapping each interleaved REG bundle to M consecutive REGs.

Figures 3, 4:
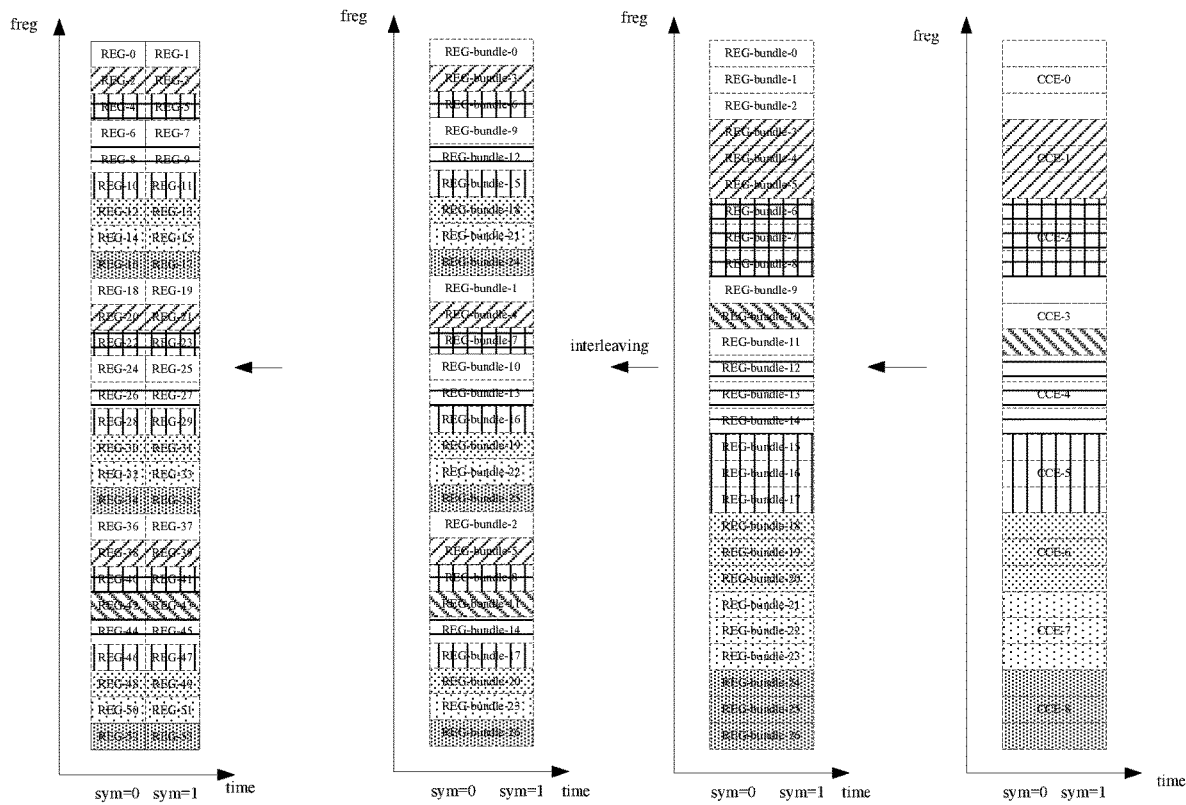
FIG. 3 is a schematic diagram of a CCE-REG mapping manner when the CCE-REG mapping manner is interleaved mapping with an interleaving interval of 9 according to a specific embodiment of the present disclosure.
FIG. 4 is a schematic diagram of a row-column interleaver.

When the network device configures interleaved mapping and the interleaving interval of the interleaver is configured to be the maximum adjustment, the maximum frequency domain diversity gain can be obtained. As shown in FIG. 3, the network device allocates 2 OFDM symbols, 27 PRBs, and a total of 54 REGs as one PDCCH, the REG bundle size is 2 REGs and the REG bundle is mapped to the REG according to the time-domain first mode. The network device configures interleaved mapping manner for CCE-REG with an interleaving interval of 9, the interleaver employs a row-column interleaver as shown in FIG. 4, and the interleaving mode includes inputting by row and outputting by column, and the output result is shown in FIG. 3. Therefore, each CCE (6 REGs) is first divided into three consecutive REG bundles, and then the REG bundles are mapped to physical resources through the interleaver. The network device configures mapping the REG bundle to the REG according to the time-domain first mode, thus, each REG bundle is mapped to two consecutive REGs in the time domain. Finally, each CCE is mapped to physical resources separated in the frequency domain, thereby obtaining frequency domain diversity gain. CCE-0 is divided into REG-bundle-0, REG-bundle-1, and REG-bundle-2; after interleaving, REG-bundle-0 is mapped to REG-0 and REG-1, REG-bundle-1 is mapped to REG-18 and REG-19, REG-bundle-2 is mapped to REG-36 and REG-37.

In this embodiment, by configuring a reasonable interleaving interval for the interleaver, the network device can configure physical resources of PDCCH in different mapping manners to overlap.

Figure 5:
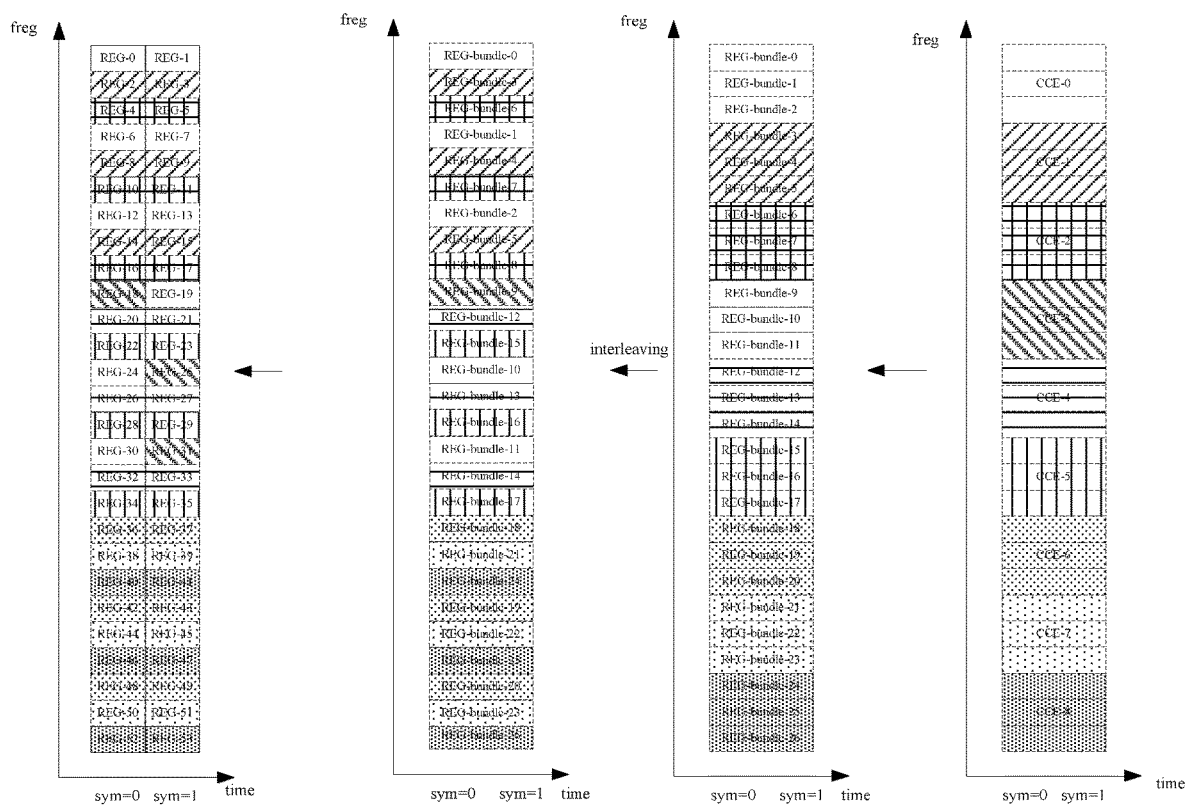
FIG. 5 is a schematic diagram of a CCE-REG mapping manner when the CCE-REG mapping manner is interleaved mapping with an interleaving interval of 3 according to a specific embodiment of the present disclosure.

In a specific embodiment, the network device allocates 2 OFDM symbols, 27 PRBs, a total of 54 REGs as one PDCCH, the REG bundle size is 2 REGs and the REG bundle is mapped to the REG according to a time-domain first mode. As shown in FIG. 5, the network device allocates PDCCH resources to different UEs, and PDCCH of UE-1 is mapped with an interleaving interval of 3 and PDCCH of UE-2 is mapped in the non-interleaved mode.

Figure 6:
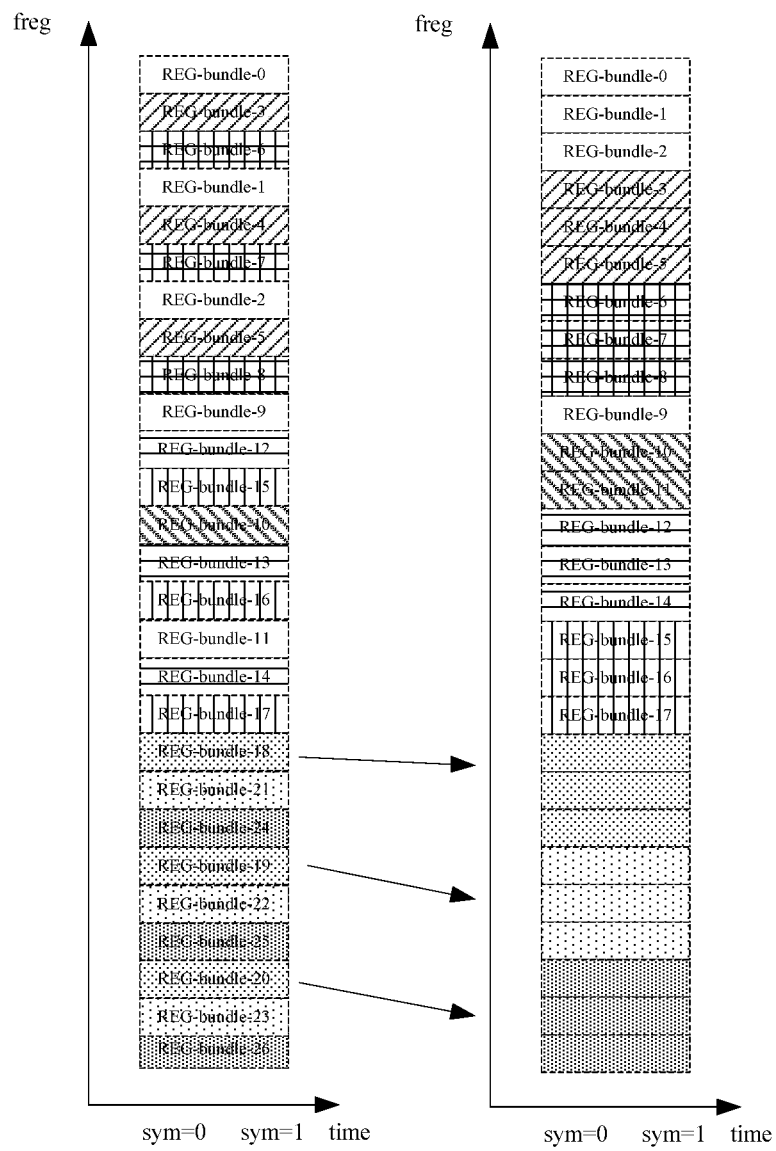
FIG. 6 and FIG. 7 are schematic diagrams showing that PDCCH of UE-1 is interleaved and PDCCH of UE-2 is non-interleaved according to an embodiment of the present disclosure.

FIG. 6 compares two mapping manners, where the left side is PDCCH of UE-1 (the mapping manner with an interleaving interval of 3), and the right side is PDCCH of UE-2 (non-interleaved mapping manner). CCE-6 (which is divided into REG bundle 18/19/20) is allocated for UE-1, as shown by arrows in the figure, CCE-6, CCE-7 and CCE-8 cannot be allocated for UE-2 because resources have been occupied. However, CCE-0~CCE-5 may still be allocated for UE-2, and these CCEs are consecutive and may constitute a higher aggregation level for resource allocation.

Therefore, allocation of one CCE on either side will only block allocation of at most 3 CCEs on the other side, and will not cause resource fragmentation on the other side (that is, the resource allocation on the other side can still aggregate the consecutive CCEs for allocation).

Figure 7:
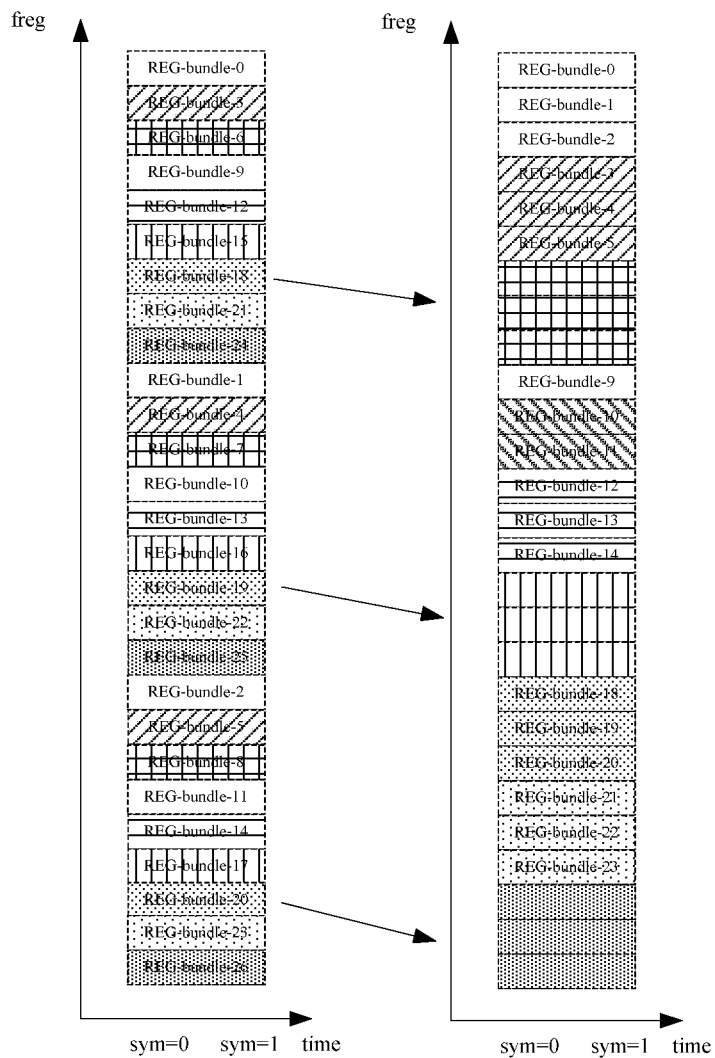

FIG. 7 shows an unreasonable mapping manner. It can be seen that CCE-6 (which is divided into REG bundle 18/19/20) is allocated for the left UE-1, as shown by arrows in the figure, CCE-2, CCE-5 and CCE-8 cannot be allocated for UE-2 because resources have been occupied. Further, these CCEs are non-consecutive fragmented resources that cannot constitute a higher aggregation level for resource allocation. As compared with FIG. 6, it can be understood that by configuring a reasonable interleaving interval for the interleaver, resource allocation can be performed well, and resources can be utilized reasonably and effectively.

Figure 8:
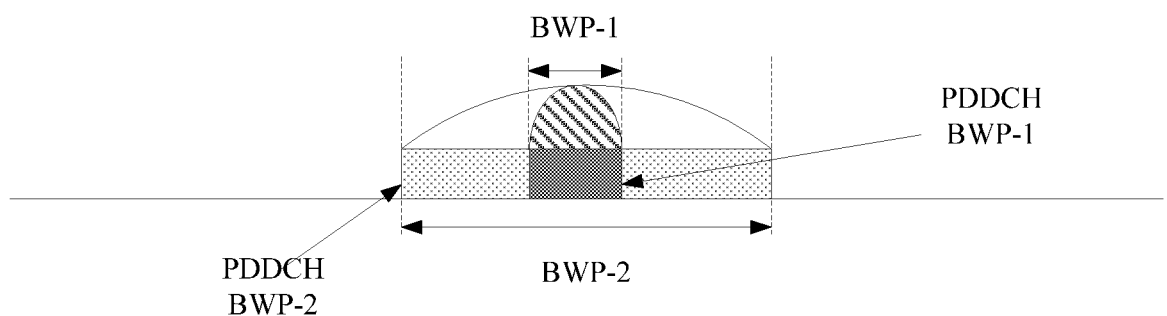
FIG. 8 is a schematic diagram of two BWPs configured by a network device for a UE according to a specific embodiment of the present disclosure.

Further, in this embodiment, the network device may further configure different BWPs for multiple UEs, or configure different BWPs for the same UE. As shown in FIG. 8, the network device configures two BWPs for the UE. One of the two BWPs, i.e., BWP-2, is larger; and the other one of the two BWPs, i.e., BWP-1, is smaller. BWP-1 is included in BWP-2, and PDCCH of BWP-1 is also included in PDCCH of BWP-2. When the UE transmits large data, BWP-2 is used; when the UE transmits small data, BWP-1 is used, thereby reducing power consumption.

When at least one of PDCCHs of BWP-1 and BWP-2 is mapped in the interleaved mapping manner, the network device can reduce blocking probability of the PDCCH resource allocation when two PDCCH resources overlap, by reasonably configuring the interleaving interval.

Figure 9:
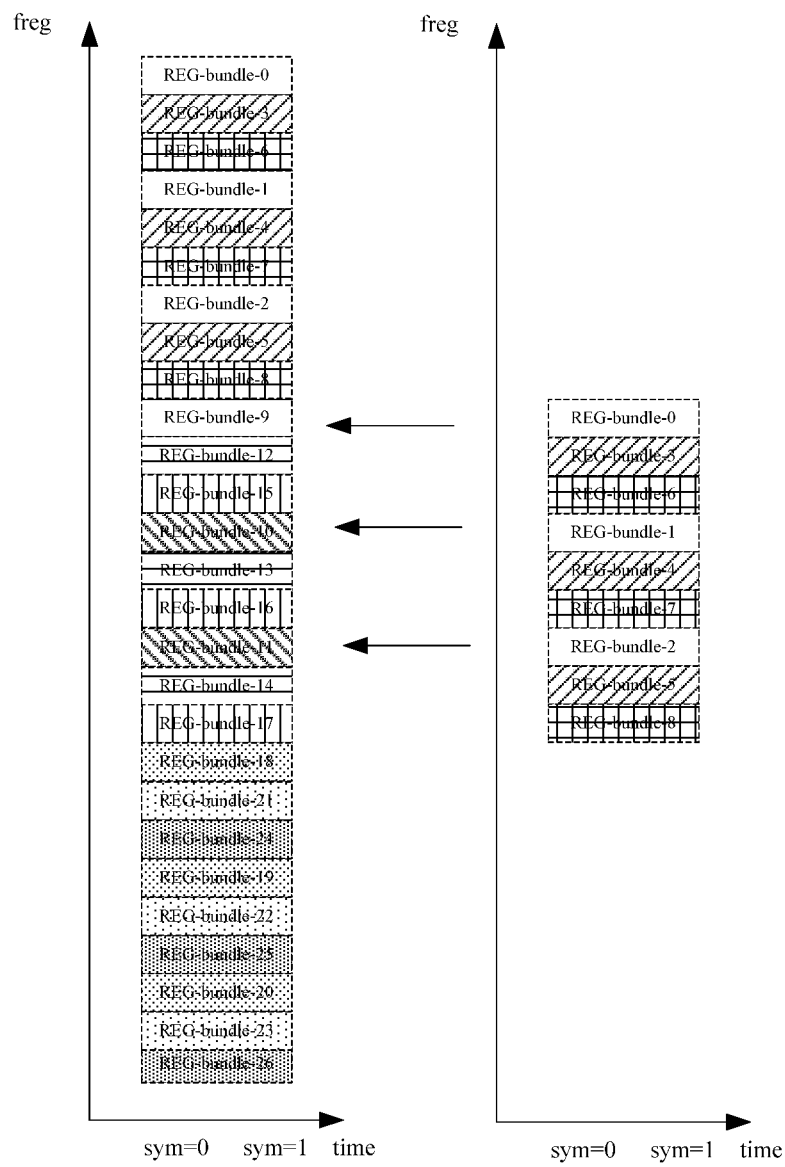
FIG. 9 is a schematic diagram showing that PDCCH of BWP-1 and BWP-2 is interleaved according to an embodiment of the present disclosure.

FIG. 9 is an example in which PDCCHs of BWP-1 and BWP-2 are both interleaved, and resources of BWP-2 include resources of BWP-1. It can be seen that resource mapping on both sides is compatible, and allocation of one CCE on either side will only block allocation of one CCE on the other side. Further, when all the CCEs of BWP-1 are allocated, BWP-2 still has 2/3 resources for allocation.

Further, the network device may configure a more complex multiple-stage interleaver, and may adjust an interleaving interval of the interleaver to further reduce the blocking probability of resource allocation. When the number of stages of the interleaver is L, the number of first-stage interleavers is K, the number of L-stage interleaver is 1, K is a positive integer, and L is an integer greater than 1, interleaving the N REG bundles according to the configuration parameter of the interleaver includes:

dividing the N REG bundles into K parts with each part of the REG bundles being corresponding to the first-stage interleaver in a one-to-one manner, and inputting each part of the REG bundles to the corresponding first-stage interleaver with K first output results obtained;

inputting the K first output results into the second-stage interleaver with a second output result obtained;

. . . ;

inputting a (L-1)-th output result into the L-stage interleaver with an L-th output result obtained.

Figure 10:
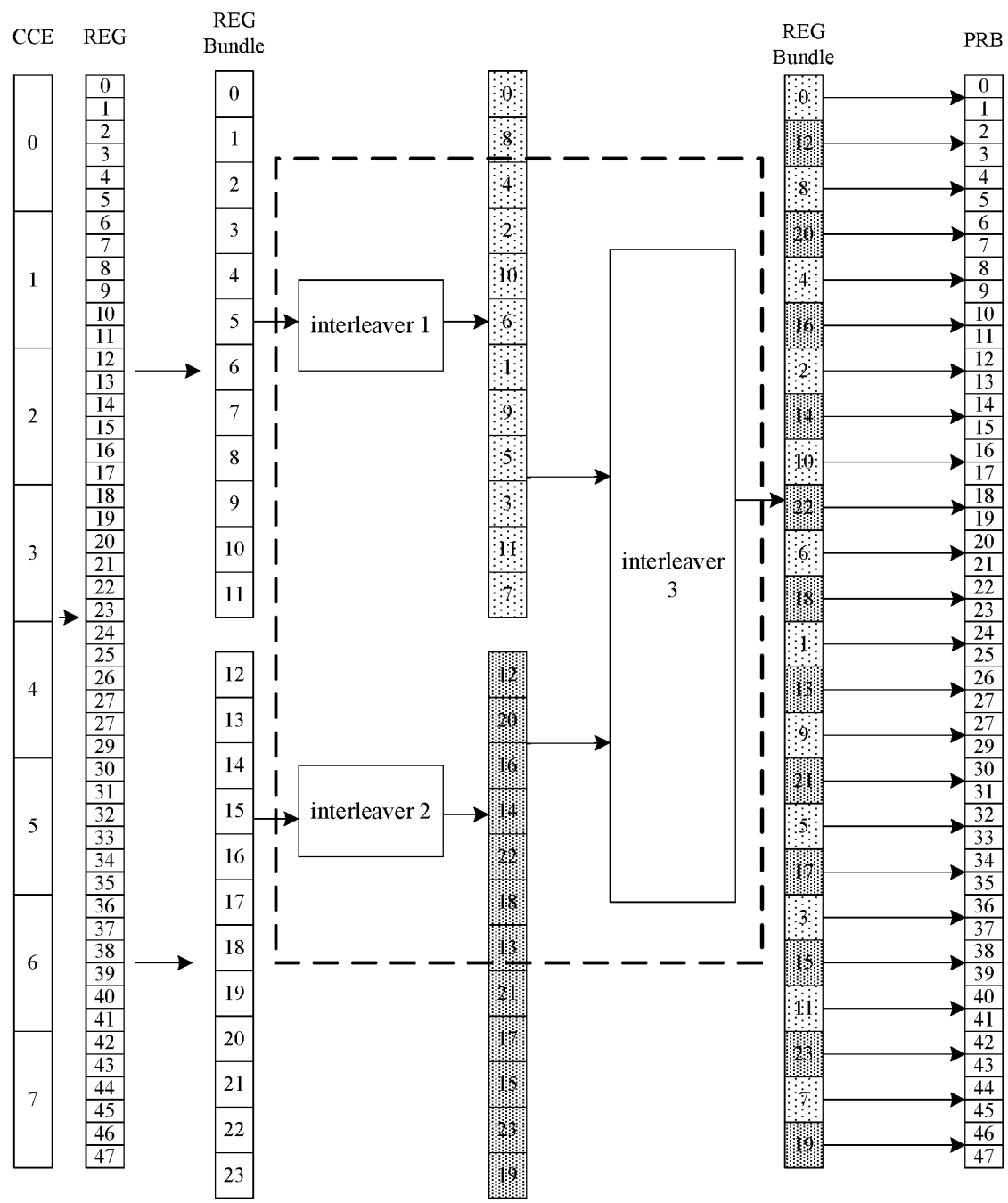
FIG. 10 is a schematic diagram of interleaved mapping performed by a multiple-stage interleaver according to an embodiment of the present disclosure.

As shown in FIG. 10, the network device allocates 2 OFDM symbols, 24 PRBs, and a total of 48 REGs as one PDCCH, the REG bundle size is 2 REGs and the REG bundle is mapped to the REG according to a time-domain first mode. As shown in FIG. 10, a dashed box in the figure represents a 2-stage interleaver; a first-stage interleaver includes two interleavers, which are an interleaver 1 and an interleaver 2, respectively; an interleaving interval of a second-stage interleaver (i.e., an interleaver 3 in the figure) is configurable and is 2 in this embodiment.

Each CCE (6 REGs) is first divided into 3 consecutive REG bundles. The REG bundles are divided into two parts, which are respectively input into the first-stage interleaver (which may be an LTE-based interleaver). Interleaving results output from the two first-stage interleavers are then input to the second-stage interleaver.

The network device configures mapping the REG bundle to the REG according to the time-domain first mode, thus, each REG bundle is mapped to two consecutive REGs in the time domain.

Finally, each CCE is mapped to physical resources separated in the frequency domain, thereby obtaining frequency domain diversity gain. Further, when two PDCCH resources of the same or different sizes and configured with the interleaved mapping manner, are overlapped, the allocation blocking probability caused by resource allocation conflict can be reduced.

Further, the above resource configuration information includes information of resource configuration for a plurality of user equipments; and/or information of a plurality of different resource configurations for the same user equipment.

Figure 11:
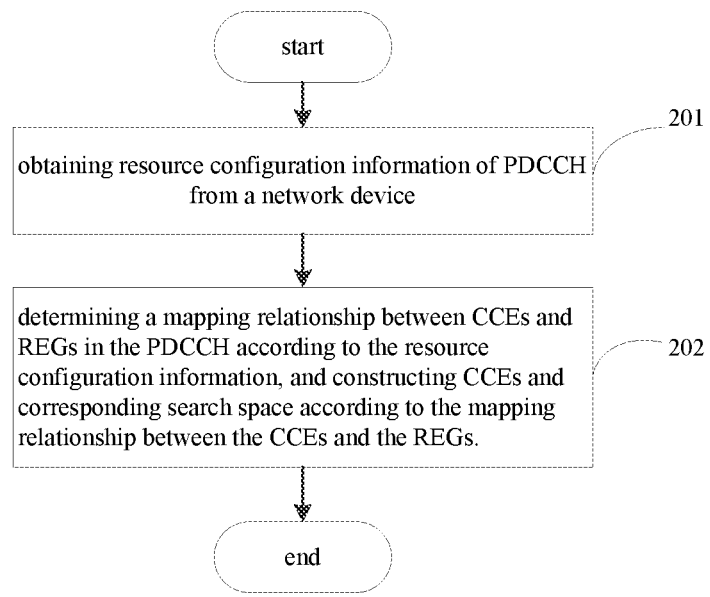
FIG. 11 is a schematic flowchart of a PDCCH resource determining method according to an embodiment of the present disclosure.

As shown in FIG. 11, an embodiment of the present disclosure further provides a PDCCH resource determining method, which is applied to a user equipment and includes the following steps.

At Step 201, obtaining resource configuration information of PDCCH from a network device. The resource configuration information at least includes: REG bundle size, CCE-REG mapping manner, and REG mapping manner.

At Step 202, determining a mapping relationship between CCEs and REGs in the PDCCH according to the resource configuration information, and constructing CCEs and corresponding search space according to the mapping relationship between the CCEs and the REGs.

Further, obtaining resource configuration information of PDCCH from a network device includes:

receiving minimum system information, system information block, radio resource control (RRC), medium access control control element (MAC CE) or group-common PDCCH message, transmitted by the network device, and obtaining the resource configuration information from the received minimum system information, system information block, radio resource control (RRC), medium access control control element (MAC CE) or group-common PDCCH message.

After the step of constructing CCEs and corresponding search space according to the mapping relationship between the CCEs and the REGs, the method further includes:

blindly detecting physical layer control signaling within the search space of the PDCCH.

Further, when the CCE-REG mapping manner is the interleaved mapping, the resource configuration information further includes a configuration parameter of the interleaver.

The configuration parameter of the interleaver includes at least one of the number of stages of the interleaver, the number of interleavers and an interleaving interval of each interleaver.

The configuration parameter of the interleaver may be configured by the network device. In addition, when there is no network configuration during the initial access, the configuration parameter of the interleaver may be predefined, and then the UE may use the predefined configuration parameter of the interleaver to perform mapping.

The network device determines the resource configuration parameter for each PDCCH according to predefined configurations and system configurations, and determines a specific resource mapping of CCE-REG in the PDCCH according to the resource configuration parameter. Then, the physical layer control signaling (for example, downlink control information (DCI)) may be transmitted on the PDCCH.

The UE obtains the configuration of the PDCCH and determines the resource configuration parameter according to the predefined configuration and the configuration of the network device. Then, the UE determines the specific resource mapping of CCE-REG in the PDCCH according to the above resource configuration parameter, and the UE starts constructing CCEs and the corresponding search space from PRB according to reverse steps and then blindly detects physical layer control signaling (for example, DCI) in the search space of the PDCCH.

Figure 12:
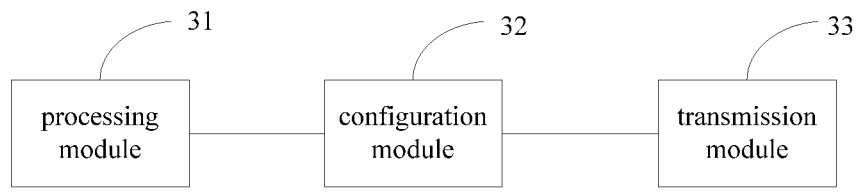
FIG. 12 is a block diagram of a network device according to an embodiment of the present disclosure.

An embodiment of the present disclosure further provides a network device, as shown in FIG. 12, including:

a processing module 31 used to determine resource configuration information of PDCCH, where the resource configuration information at least includes: REG bundle size, CCE-REG mapping manner, and REG mapping manner;

a configuration module 32 used to configure PDCCH resources according to the resource configuration information;

a transmission module 33 used to transmit the resource configuration information to a user equipment.

This embodiment provides a CCE-REG mapping method applicable to PDCCH/CORESET in the 5G NR system, in which the network device sets the resource configuration information of PDCCH and notifies the user equipment of the resource configuration information, where the resource configuration information at least includes: REG bundle size, CCE-REG mapping manner and REG mapping manner. This can effectively support application of multiple different CCE-REG mapping manners to the same PDCCH/CORESET, or configuration that resources of multiple PDCCH/CORESET with different sizes overlap each other. Meanwhile, this can reduce blocking probability of PDCCH resource allocation, and improve system flexibility and resource utilization. It should be noted that the REG mapping manner includes at least one of frequency-domain resource (position and number of PRBs), time-domain resource (number of OFDM symbols), and mapping order (frequency-domain first or time-domain first).

Further, the network device further includes:

a mapping module, used to map the PDCCH to a physical resource.

Further, the transmission module 33 is specifically used to transmit the resource configuration information to the user equipment, by minimum system information, system information block, radio resource control (RRC), medium access control control element (MAC CE) or group-common PDCCH message.

Further, the transmission module 33 is specifically used to transmit physical layer control signaling in the PDCCH.

When the CCE-REG mapping manner is non-interleaved mapping, the configuration module 32 is used to map each CCE to one or more consecutive REG bundles according to the REG bundle size, and map each REG bundle to multiple REGs according to the REG bundle size and the REG mapping manner.

In a specific implementation, the REG bundle size is M REGs, each CCE corresponds to N REG bundles, M is an integer greater than 1, and N is a positive integer. The configuration module 32 is specifically used to map each CCE to N consecutive REG bundles, and map each REG bundle to M consecutive REGs.

When the CCE-REG mapping manner is interleaved mapping, the resource configuration information further includes a configuration parameter of the interleaver. The configuration module 32 is specifically used to map each CCE to multiple REG bundles according to the REG bundle size, interleave the multiple REG bundles according to the configuration parameter of the interleaver, and map each interlaced REG bundle to multiple REGs according to the REG bundle size and the REG mapping manner.

The configuration parameter of the interleaver includes at least one of a number of stages of interleaver, the number of interleavers, and an interleaving interval of each interleaver.

The configuration parameter of the interleaver may be configured by the network device. In addition, when there is no network configuration during the initial access, the configuration parameter of the interleaver may be predefined, and then the UE may use the predefined configuration parameter of the interleaver to perform mapping.

In a specific implementation, the REG bundle size is M REGs, each CCE corresponds to N REG bundles, M is an integer greater than 1, and N is a positive integer.

The configuration module 32 is specifically used to map each CCE to N consecutive REG bundles, interleave the N REG bundles according to the configuration parameter of the interleaver, and map each interleaved REG bundle to M consecutive REGs.

In one embodiment, when the number of stages of the interleaver is L, the number of first-stage interleavers is K, the number of L-stage interleaver is 1, K is a positive integer, and L is an integer greater than 1, the configuration module 32 is specifically used to, divide the N REG bundles into K parts with each part of the REG bundles being corresponding to the first-stage interleaver in a one-to-one manner, input each part of the REG bundles to the corresponding first-stage interleaver with K first output results obtained; input the K first output results into the second-stage interleaver with a second output result obtained; . . . ; input a (L-1)-th output result into the L-stage interleaver with an L-th output result obtained.

Further, the resource configuration information includes information of resource configuration for a plurality of user equipments; and/or information of a plurality of different resource configurations for the same user equipment.

Figure 13:
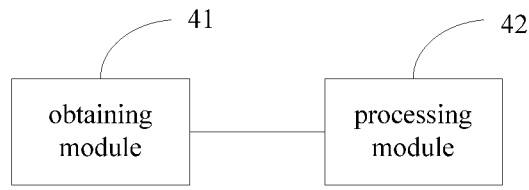
FIG. 13 is a block diagram of a user equipment according to an embodiment of the present disclosure.

As shown in FIG. 13, an embodiment of the present disclosure further provides a user equipment including:

an obtaining module 41 used to obtain resource configuration information of PDCCH from a network device; where the resource configuration information at least includes: REG bundle size, CCE-REG mapping manner, and REG mapping manner;

a processing module 42 used to determine a mapping relationship between CCEs and REGs in the PDCCH according to the resource configuration information, and construct CCEs and corresponding search space according to the mapping relationship between the CCEs and the REGs.

Further, the obtaining module 41 is specifically used to receive minimum system information, system information block, radio resource control (RRC), medium access control control element (MAC CE) or group-common PDCCH message, transmitted by the network device, and obtain the resource configuration information from the received minimum system information, system information block, radio resource control (RRC), medium access control control element (MAC CE) or group-common PDCCH message.

Further, the user equipment further includes:

a detecting module, used to blindly detect physical layer control signaling within the search space of the PDCCH.

Further, when the CCE-REG mapping manner is the interleaved mapping, the resource configuration information further includes a configuration parameter of the interleaver.

The configuration parameter of the interleaver includes at least one of the number of stages of the interleaver, the number of interleavers and an interleaving interval of each interleaver.

The configuration parameter of the interleaver may be configured by the network device. In addition, when there is no network configuration during the initial access, the configuration parameter of the interleaver may be predefined, and then the UE may use the predefined configuration parameter of the interleaver to perform mapping.

An embodiment of the present disclosure further provides a network device, including: a memory, a processor, and a computer program stored on the memory and executable on the processor. The computer program is executed by the processor to implement steps of the PDCCH resource configuration method.

Figure 14:
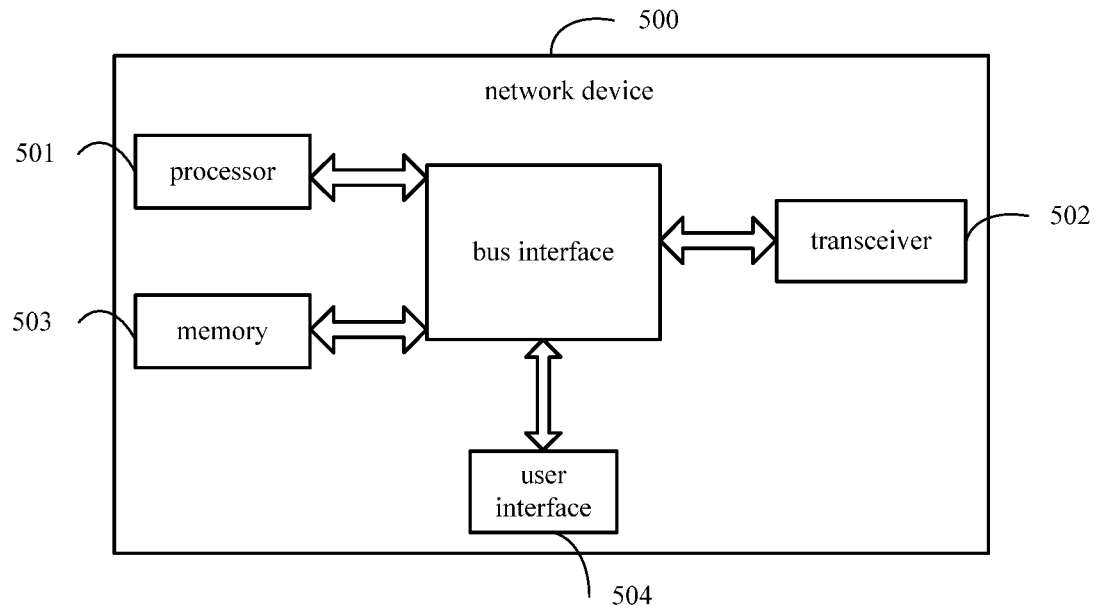
FIG. 14 is a schematic diagram of a network device according to an embodiment of the present disclosure.

Referring to FIG. 14, FIG. 14 is a schematic diagram of a network device according to an embodiment of the present disclosure, which can implement the details of the PDCCH resource configuration method in the foregoing embodiment and achieve the same effect. As shown in FIG. 14, a network device 500 includes a processor 501, a transceiver 502, a memory 503, a user interface 504, and a bus interface 506.

In one embodiment of the present disclosure, the network device 500 further includes a computer program stored on the memory 503 and executable on the processor 501. The computer program is executed by the processor 501 to perform steps: determining resource configuration information of PDCCH, where the resource configuration information at least includes: REG bundle size, CCE-REG mapping manner, and REG mapping manner; configuring PDCCH resources according to the resource configuration information, and transmitting the resource configuration information to a user equipment.

In FIG. 5, the bus architecture may include any number of interconnected buses and bridges, which are specifically linked by various circuits, such as one or more processors represented by the processor 501 and one or more storages represented by the memory 503. The bus architecture can also link various other circuits such as peripheral devices, voltage regulators, and power management circuits, all of which are well known in this field and are therefore not further described in the present disclosure. The bus interface provides an interface. The transceiver 502 may include a plurality of components, i.e. a transmitter and a transceiver and provide a unit for communicating with various other devices on the transmission medium. As for different UEs, the user interface 504 may further externally connect or internally connect interfaces of required devices. The connected devices may include but not be limited to a keypad, monitor, speaker, microphone, joystick, etc.

The processor 501 is responsible for managing bus architecture and general processing. The memory 503 may store data used by the processor 501 when the processor 501 executes operations.

Optionally, the computer program is executed by the processor 501 to perform the following step of mapping the PDCCH to a physical resource.

Optionally, the computer program is executed by the processor 501 to perform the following step of transmitting, by the network device, the resource configuration information to the user equipment, by minimum system information, system information block, radio resource control (RRC), medium access control control element (MAC CE) or group-common PDCCH message.

Optionally, the computer program is executed by the processor 501 to perform the following step of transmitting physical layer control signaling in the PDCCH.

Optionally, when the CCE-REG mapping manner is non-interleaved mapping, the computer program is executed by the processor 501 to perform the following steps: mapping each CCE to one or more consecutive REG bundles according to the REG bundle size; mapping each REG bundle to multiple REGs according to the REG bundle size and the REG mapping manner.

Optionally, the REG bundle size is M REGs, each CCE corresponds to N REG bundles, M is an integer greater than 1, and N is a positive integer. The computer program is executed by the processor 501 to perform the following steps: mapping each CCE to N consecutive REG bundles; and, mapping each REG bundle to M consecutive REGs.

Optionally, when the CCE-REG mapping manner is interleaved mapping, the computer program is executed by the processor 501 to perform the following steps: mapping each CCE to multiple REG bundles according to the REG bundle size; interleaving the multiple REG bundles according to the configuration parameter of the interleaver; mapping each interlaced REG bundle to multiple REGs according to the REG bundle size and the REG mapping manner.

The configuration parameter of the interleaver is configured by the network device or predefined.

The configuration parameter of the interleaver includes at least one of a number of stages of interleaver, the number of interleavers, and an interleaving interval of each interleaver.

Optionally, the REG bundle size is M REGs, each CCE corresponds to N REG bundles, M is an integer greater than 1, and N is a positive integer. The computer program is executed by the processor 501 to perform the following steps: mapping each CCE to N consecutive REG bundles; interleaving the N REG bundles according to the configuration parameter of the interleaver; mapping each interleaved REG bundle to M consecutive REGs.

Optionally, when the number of stages of the interleaver is L, the number of first-stage interleavers is K, the number of L-stage interleaver is 1, K is a positive integer, and L is an integer greater than 1. The computer program is executed by the processor 501 to perform the following steps: dividing the N REG bundles into K parts with each part of the REG bundles being corresponding to the first-stage interleaver in a one-to-one manner, and inputting each part of the REG bundles to the corresponding first-stage interleaver with K first output results obtained; inputting the K first output results into the second-stage interleaver with a second output result obtained; . . . ; inputting a (L-1)-th output result into the L-stage interleaver with an L-th output result obtained.

The resource configuration information includes information of resource configuration for a plurality of user equipments; and/or information of a plurality of different resource configurations for the same user equipment.

An embodiment of the present disclosure further provides a user equipment, including: a memory, a processor, and a computer program stored on the memory and executable on the processor. The computer program is executed by the processor to implement steps of the above PDCCH resource determining method.

Figure 15:
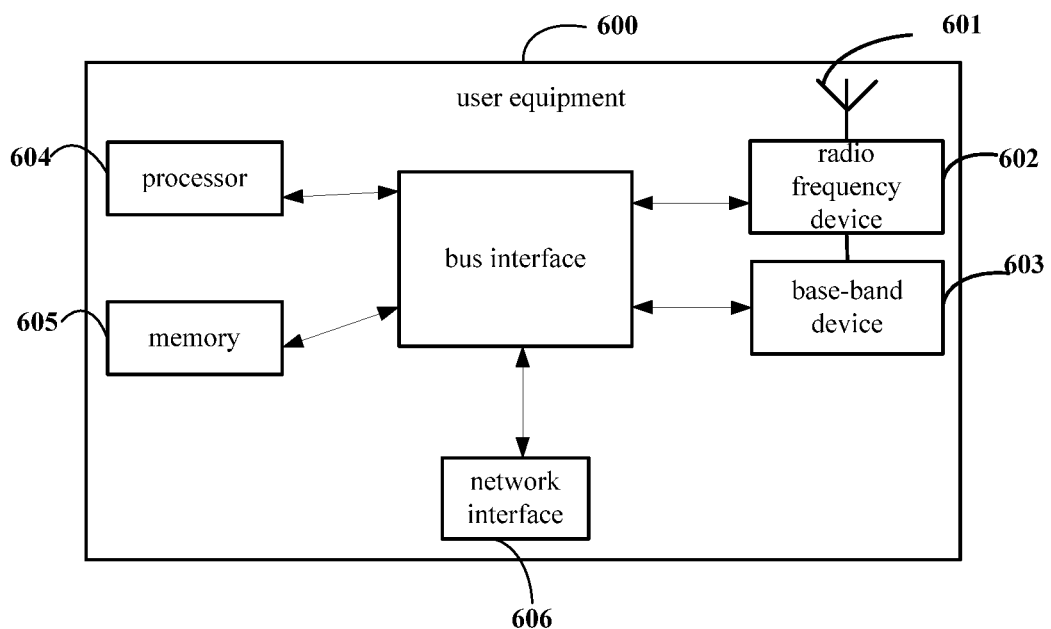
FIG. 15 is a schematic diagram of a user equipment according to an embodiment of the present disclosure.

Referring to FIG. 15, FIG. 15 is a diagram of a user equipment according to an embodiment of the present disclosure, which can implement the details of the PDCCH resource determining method in the foregoing embodiment and achieve the same effect. As shown in FIG. 15, the user equipment 600 includes a processor 604, an antenna 601, a radio frequency device 602, a base-band device 603, a memory 605, a network interface 606, and a bus interface 608.

In the embodiment of the present disclosure, the user equipment 600 further includes a computer program stored on the memory 605 and executable on the processor 604. The computer program is executed by the processor 604 to perform steps: obtaining resource configuration information of PDCCH from a network device, where the resource configuration information at least includes: REG bundle size, CCE-REG mapping manner, and REG mapping manner; determining a mapping relationship between CCEs and REGs in the PDCCH according to the resource configuration information, and constructing CCEs and corresponding search space according to the mapping relationship between the CCEs and the REGs.

Further, when the CCE-REG mapping manner is the interleaved mapping, the resource configuration information further includes a configuration parameter of the interleaver.

The configuration parameter of the interleaver may be configured by the network device or predefined. The configuration parameter of the interleaver includes at least one of the number of stages of the interleaver, the number of interleavers and an interleaving interval of each interleaver.

In FIG. 15, the bus architecture may include any number of interconnected buses and bridges, which are specifically linked by various circuits, such as one or more processors represented by processor 604 and one or more storages represented by the memory 605. The bus architecture can also link various other circuits such as peripheral devices, voltage regulators, and power management circuits, all of which are well known in this field and are therefore not further described in the present disclosure. The bus interface provides an interface. The network interface 606 may further externally connect or internally connect interfaces of required devices. The connected devices may include but not be limited to a keypad, monitor, speaker, microphone, joystick, etc.

The processor 604 is responsible for managing bus architecture and general processing. The memory 605 may store data used by the processor 604 when the processor 604 executes operations.

Optionally, the computer program is executed by the processor 604 to perform steps: receiving minimum system information, system information block, radio resource control (RRC), medium access control control element (MAC CE) or group-common PDCCH message, transmitted by the network device, and obtaining the resource configuration information from the received minimum system information, system information block, radio resource control (RRC), medium access control control element (MAC CE) or group-common PDCCH message.

Optionally, the computer program is executed by the processor 604 to perform the step: blindly detecting physical layer control signaling within the search space of the PDCCH.

An embodiment of the present disclosure further provides a computer readable storage medium. The computer readable storage medium stores a computer program. The computer program is executed by a processor to implement steps of the PDCCH resource configuration method or implement steps of the above PDCCH resource determining method It will be appreciated that the embodiments described herein may be implemented in hardware, software, firmware, middleware, microcode, or a combination thereof. For hardware implementation, the processing unit may be implemented in at least one application specific integrated circuits (ASICs), digital signal processing (DSP), DSP device (DSPD), programmable programmable logic device (PLD), field-programmable gate array (FPGA), general purpose processor, controller, microcontroller, microprocessor, other electronic unit capable of performing functions described herein or a combination thereof.

For a software implementation, the techniques described herein may be implemented by modules (for example, procedures, functions) that perform the functions described herein. Software codes may be stored in a memory and executed by a processor. The memory may be implemented in the processor or external to the processor.

The various embodiments in the present disclosure are described in a progressive manner. Each embodiment focuses on differences from other embodiments. The same or similar parts between the various embodiments can be referred to each other.

Those skilled in the art will appreciate that embodiments of the disclosed embodiments may be provided as a method, an apparatus, or a computer program product. Thus, embodiments of the present disclosure may take the form of an entirely hardware embodiment, an entirely software embodiment, or a combination of software and hardware. Moreover, embodiments of the present disclosure may take the form of a computer program product embodied on one or more computer usable storage media (including but not limited to disk storage, CD-ROM, optical storage, etc.) including computer usable program codes.

Embodiments of the present disclosure are described with reference to flowcharts and/or block diagrams of methods, terminal devices (systems), and computer program products according to the embodiments of the present disclosure. It should be understood that each flow and/or block of the flowcharts and/or block diagrams and a combination of a flow and/or a block of the flowcharts and/or block diagrams may be implemented by computer program instructions. These computer program instructions can be provided to a processor of a general purpose computer, a special purpose computer, an embedded processor or another programmable data processing terminal device to produce a machine such that the instructions executed by the processor of the computer or the other programmable data processing terminal device produce an apparatus for implementing functions specified by one or more processes in the flowcharts and/or by one or more blocks in the block diagrams.

The computer program instructions may also be stored in a computer readable storage that can direct the computer or the other programmable data processing terminal device to operate in a particular manner, such that the instructions stored in the computer readable storage produce an article of manufacture comprising an instruction apparatus. The instruction apparatus implements functions specified by one or more processes in the flowcharts and/or by one or more blocks in the block diagrams.

These computer program instructions may also be loaded onto the computer or the other programmable data processing terminal device such that a series of operational steps are performed on the computer or the other programmable terminal device to produce computer-implemented processing, such that the instructions executed by the computer or the other programmable terminal device provide steps for implementing functions specified by one or more processes in the flowcharts and/or by one or more blocks in the block diagrams.

While the preferred embodiments of the embodiments of the present disclosure have been described, it will be apparent that those skilled in the art can make further changes and modifications to the embodiments. Therefore, the appended claims are intended to be interpreted as including the preferred embodiments and all changes and modifications that fall within the scope of the embodiments of the present disclosure.

It should also be noted that in the present disclosure, relational terms such as first and second are used merely to distinguish one entity or operation from another entity or operation, and do not necessarily require or imply there is any such actual relationship or order among these entities or operations. Furthermore, the terms "comprise", "include" or any other variations are intended to encompass a non-exclusive inclusion, such that a process, method, commodity, or device that include a series of elements include not only those elements but also other elements that are not explicitly listed, or elements that are inherent to such process, method, commodity, or device. Without more restrictions, an element defined by the phrase "include a . . . " does not exclude the presence of an additional equivalent element in the process, method, commodity, or device including the element.

The above are optional embodiments of the present disclosure. It should be noted that those skilled in the art may make several improvements and modifications without departing from the principles of the present disclosure and these improvements and modifications are covered by the protection scope of the present disclosure.

What is claimed is:

1. A PDCCH resource configuration method, which is applied to a network device, comprising:
   determining resource configuration information of PDCCH; wherein the resource configuration information at least comprises: REG bundle size, CCE-REG mapping manner, and REG mapping manner; when the CCE-REG mapping manner is interleaved mapping, the resource configuration information further comprises a configuration parameter of an interleaver; the configuration parameter of the interleaver comprises at least one of the number of stages of interleaver, the number of interleavers, and an interleaving interval of each interleaver; and
   configuring PDCCH resources according to the resource configuration information, and transmitting the resource configuration information to a user equipment.

2. The method according to claim 1, wherein after the step of configuring PDCCH resources according to the resource configuration information, the method further comprises:
   mapping the PDCCH to a physical resource.

3. The method according to claim 1, wherein the transmitting the resource configuration information to a user equipment comprises:
   transmitting the resource configuration information to the user equipment, by minimum system information, system information block, radio resource control (RRC), medium access control control element (MAC CE) or group-common PDCCH message.

4. The method according to claim 1, wherein after the step of transmitting the resource configuration information to a user equipment, the method further comprises:
   transmitting physical layer control signaling in the PDCCH.

5. The method according to claim 1, wherein the configuring PDCCH resources according to the resource configuration information comprises:
   mapping each CCE to multiple REG bundles according to the REG bundle size;
   interleaving the multiple REG bundles according to the configuration parameter of the interleaver; and
   mapping each interlaced REG bundle to multiple REGs according to the REG bundle size and the REG mapping manner.

6. The method according to claim 5, wherein the configuration parameter of the interleaver is configured by the network device or predefined.

7. The method according to claim 6, wherein the REG bundle size is M REGs, each CCE corresponds to N REG bundles, M is an integer greater than 1, and N is a positive integer; the configuring PDCCH resources according to the resource configuration information specifically comprises:
   mapping each CCE to N consecutive REG bundles;
   interleaving the N REG bundles according to the configuration parameter of the interleaver; and
   mapping each interleaved REG bundle to M consecutive REGs.

8. The method according to claim 7, wherein when the number of stages of interleaver is L, the number of first-stage interleavers is K, the number of L-stage interleaver is 1, K is a positive integer, and L is an integer greater than 1, the interleaving the N REG bundles according to the configuration parameter of the interleaver comprises:
   dividing the N REG bundles into K parts with each part of the REG bundles being corresponding to the first-stage interleaver in a one-to-one manner, and inputting each part of the REG bundles to the corresponding first-stage interleaver with K first output results obtained;
   inputting the K first output results into a second-stage interleaver with a second output result obtained;
   . . . ;
   inputting a (L-1)-th output result into the L-stage interleaver with an L-th output result obtained.

9. The method according to claim 1, wherein the resource configuration information comprises information of resource configurations for a plurality of user equipments; and/or information of a plurality of different resource configurations for the same user equipment.

10. A PDCCH resource determining method, which is applied to a user equipment, comprising:
    obtaining resource configuration information of PDCCH from a network device; wherein the resource configuration information at least comprises: REG bundle size, CCE-REG mapping manner, and REG mapping manner; when the CCE-REG mapping manner is interleaved mapping, the resource configuration information further comprises a configuration parameter of an interleaver; the configuration parameter of the interleaver comprises at least one of the number of stages of interleaver, the number of interleavers, and an interleaving interval of each interleaver; and
    determining a mapping relationship between CCEs and REGs in the PDCCH according to the resource configuration information, and constructing CCEs and corresponding search space according to the mapping relationship between the CCEs and the REGs.

11. The method according to claim 10, wherein the obtaining resource configuration information of PDCCH from a network device comprises:

receiving minimum system information, system information block, radio resource control (RRC), medium access control control element (MAC CE) or group-common PDCCH message, transmitted by the network device, and obtaining the resource configuration information from the received minimum system information, system information block, RRC, MAC CE or group-common PDCCH message.

12. The method according to claim 10, wherein after the step of constructing CCEs and corresponding search space according to the mapping relationship between the CCEs and the REGs, the method further comprises:
blindly detecting physical layer control signaling within the search space of the PDCCH.

13. The method according to claim 10, wherein the configuration parameter of the interleaver is configured by the network device or predefined.

14. A user equipment comprising: a memory, a processor, and a computer program stored on the memory and executable on the processor; wherein the computer program is executed by the processor to implement steps;
obtaining resource configuration information of PDCCH from a network device; wherein the resource configuration information at least comprises: REG bundle size, CCE-REG mapping manner, and REG mapping manner; when the CCE-REG mapping manner is interleaved mapping, the resource configuration information further comprises a configuration parameter of an interleaver; the configuration parameter of the interleaver comprises at least one of the number of stages of interleaver, the number of interleavers and an interleaving interval of each interleaver; and
determining a mapping relationship between CCEs and REGs in the PDCCH according to the resource configuration information, and constructing CCEs and corresponding search space according to the mapping relationship between the CCEs and the REGs.

15. The user equipment according to claim 14, wherein the computer program is executed by the processor to implement steps of:
receiving minimum system information, system information block, radio resource control (RRC), medium access control control element (MAC CE) or group-common PDCCH message, transmitted by the network device, and obtaining the resource configuration information from the received minimum system information, system information block, RRC, MAC CE or group-common PDCCH message.

16. The user equipment according to claim 14, wherein after constructing CCEs and corresponding search space according to the mapping relationship between the CCEs and the REGs, the computer program is executed by the processor to further implement steps of:
blindly detecting physical layer control signaling within the search space of the PDCCH.

17. The user equipment according to claim 14, wherein the configuration parameter of the interleaver is configured by the network device or predefined.

* * * * *